(12) United States Patent
Ji et al.

(10) Patent No.: US 9,600,373 B2
(45) Date of Patent: Mar. 21, 2017

(54) METHOD AND SYSTEM FOR CLUSTER RESOURCE MANAGEMENT IN A VIRTUALIZED COMPUTING ENVIRONMENT

(71) Applicant: VMware, Inc., Palo Alto, CA (US)

(72) Inventors: Minwen Ji, Los Altos, CA (US); Elisha Ziskind, Sharon, MA (US); Anne Marie Holler, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/952,805

(22) Filed: Jul. 29, 2013

(65) Prior Publication Data

US 2013/0311824 A1 Nov. 21, 2013

Related U.S. Application Data

(63) Continuation of application No. 12/726,119, filed on Mar. 17, 2010, now Pat. No. 8,510,590.

(51) Int. Cl.
*G06F 11/14* (2006.01)
*G06F 11/20* (2006.01)
*G06F 9/455* (2006.01)

(52) U.S. Cl.
CPC ...... *G06F 11/1448* (2013.01); *G06F 9/45533* (2013.01); *G06F 9/45558* (2013.01); *G06F 11/1438* (2013.01); *G06F 11/1484* (2013.01); *G06F 11/203* (2013.01); *G06F 2009/45579* (2013.01)

(58) Field of Classification Search
USPC .......................................................... 714/3
See application file for complete search history.

(56) References Cited

U.S. PATENT DOCUMENTS

| | | | |
|---|---|---|---|
| 7,089,293 | B2 | 8/2006 | Grosner et al. |
| 7,975,165 | B2 | 7/2011 | Shneorson et al. |
| 2006/0064687 | A1 | 3/2006 | Dostert |
| 2006/0155912 | A1 | 7/2006 | Singh et al. |
| 2008/0244525 | A1 | 10/2008 | Khalil et al. |
| 2009/0228589 | A1 | 9/2009 | Korupolu |
| 2009/0288084 | A1 | 11/2009 | Astete et al. |
| 2009/0300173 | A1 | 12/2009 | Bakman et al. |
| 2009/0307597 | A1 | 12/2009 | Bakman |
| 2010/0050171 | A1 | 2/2010 | Liang et al. |
| 2010/0250824 | A1 | 9/2010 | Belay |
| 2010/0251004 | A1 | 9/2010 | Schuba et al. |
| 2010/0275200 | A1* | 10/2010 | Radhakrishnan et al. ........ 718/1 |
| 2010/0306382 | A1 | 12/2010 | Cardosa et al. |
| 2010/0332622 | A1 | 12/2010 | Carolan et al. |
| 2010/0332889 | A1 | 12/2010 | Shneorson et al. |

(Continued)

*Primary Examiner* — Kamini Patel
(74) *Attorney, Agent, or Firm* — Patterson & Sheridan LLP

(57) ABSTRACT

Methods and systems for cluster resource management in virtualized computing environments are described. VM spares are used to reserve (or help discover or otherwise obtain) a set of computing resources for a VM. While VM spares may be used for a variety of scenarios, particular uses of VM spares include using spares to ensure resource availability for requests to power on VMs as well as for discovering, obtaining, and defragmenting the resources and VMs on a cluster, e.g., in response to requests to reserve resources for a VM or to respond to a notification of a failure for a given VM.

14 Claims, 5 Drawing Sheets

(56) References Cited

U.S. PATENT DOCUMENTS

| | | |
|---|---|---|
| 2011/0066897 A1 | 3/2011 | Bumgarner et al. |
| 2011/0072430 A1 | 3/2011 | Mani |
| 2011/0154332 A1 | 6/2011 | Shirae et al. |
| 2011/0214005 A1 | 9/2011 | Biran et al. |

* cited by examiner

METHOD AND SYSTEM FOR CLUSTER RESOURCE MANAGEMENT IN A VIRTUALIZED COMPUTING ENVIRONMENT

CROSS REFERENCE TO RELATED APPLICATIONS

This application is a continuation of the U.S. patent application Ser. No. 12/726,119 filed on Mar. 17, 2010, entitled "Method and System for Cluster Resource Management in a Virtualized Computing Environment."

BACKGROUND

Computer virtualization is a technique that involves encapsulating a physical computing machine platform into a virtual machine that is executed under the control of virtualization software on a hardware computing platform. Virtualization software enables multiple virtual machines to be run on a single hardware computing platform, and can manage the allocation of computing resources to each virtual machine.

A set of hardware computing platforms can be organized as a server cluster to provide computing resources for, example, for a data center. In addition, supporting technology can move running virtual machines between servers (also referred to herein as "host systems") in the cluster; an example of this supporting technology is sold as VMware vMotion® by VMware, Inc. of Palo Alto, Calif. In addition, server cluster virtualization management software can determine initial and ongoing locations of virtual machines on hosts within the server cluster, and can manage the allocation of cluster computing resources. An example of this server cluster virtualization management software is sold as VMware Distributed Resource Scheduler™ by VMware, Inc. of Palo Alto, Calif. In addition, high availability software (hereinafter referred to as "HAS") provides features that monitor virtual machines to detect operating system and hardware failures, restart virtual machines on other physical servers in the cluster without manual intervention when server failure is detected, and protect applications from operating system failures by automatically restarting virtual machines when an operating system failure is detected. An example of this high availability software is sold as vSphere™ by VMware, Inc. of Palo Alto, Calif.

The cluster resource management service for a virtualized environment handles the placement and scheduling of a set of virtual machines (VMs) on a set of hosts that each belong to a cluster, in accordance with a set of constraints and objectives. To address constraint violations and achieve objectives, the cluster resource management service generates and can automatically execute live migrations of VMs between hosts and can recommend powering on hosts. For a VM to be powered-on on a host within a cluster, the cluster needs to have sufficient computing resources compatible with the VM's execution constraints to meet the VM's admission control requirements, and those resources must be available in unfragmented form, i.e., all on a single host in the cluster.

SUMMARY

One or more embodiments of the present invention use "spare" virtual machines (VMs) to address a number of different problems that arise related to resource availability, scheduling, and failover in a managed cluster environment.

For example, one embodiment of the invention includes a method for managing computing resources available in a computing cluster. The method may generally include storing, in a snapshot, a representation of the resources allocated to a plurality of VMs executing on a plurality of hosts within the computing cluster, storing, in the snapshot, at least one VM spare, wherein the VM spare identifies a set of computing resources available in the computing cluster reserved for allocation to the VM spare, and allocating computing resources available in the cluster according to the snapshot.

The computing resources identified in a VM spare may include an indication of memory, processing capacity, a storage capacity, or networking resources, etc., to allocate a given VM spare. In a particular embodiment, allocating computing resources available in the cluster according to the snapshot may include receiving a request for a recommendation for powering-on one or more VMs on the hosts of the cluster, evaluating the snapshot to determine whether computing resources are available to allocate for each of the VMs in the request, and in response to determining that computing resources are available to allocate for each of the VMs in the request, generating the one or more VM spares, wherein each VM spare corresponds to and hence reserves resources for one of the VMs in the request. Subsequently, the one or more VMs may be powered on and each of the one or more VM spares in the snapshot replaced with the corresponding powered-on VM.

In yet another embodiment, allocating computing resources available in the cluster according to the snapshot may include receiving a request to create the one or more VM spares in the snapshot, where the request is generated in response to a determination that one of the VMs on a given host has failed after at least one unsuccessful attempt to restart the failed VM. In such a case, in response, the one or more VM spares are created and stored in the snapshot to correspond to the one or more failed VMs.

In still another embodiment, allocating computing resources available in the cluster according to the snapshot may include receiving a request to create the one or more VM spares in the snapshot, where the request is to create at least a first VM spare to correspond to one of the VMs executing on a first host in the cluster. And in response, creating the first VM spare, where the first VM spare is associated with a VM-to-VM anti-affinity rule which requires computing resources for the first VM spare to be reserved in a manner that does not include the use of computing resources available on the first host.

Other embodiments of the present invention include, without limitation, a computer-readable storage medium that includes instructions that enable a processing unit to implement one or more aspects of the disclosed methods as well as a system configured to implement one or more aspects of the disclosed methods.

DETAILED DESCRIPTION

Figure 1A:
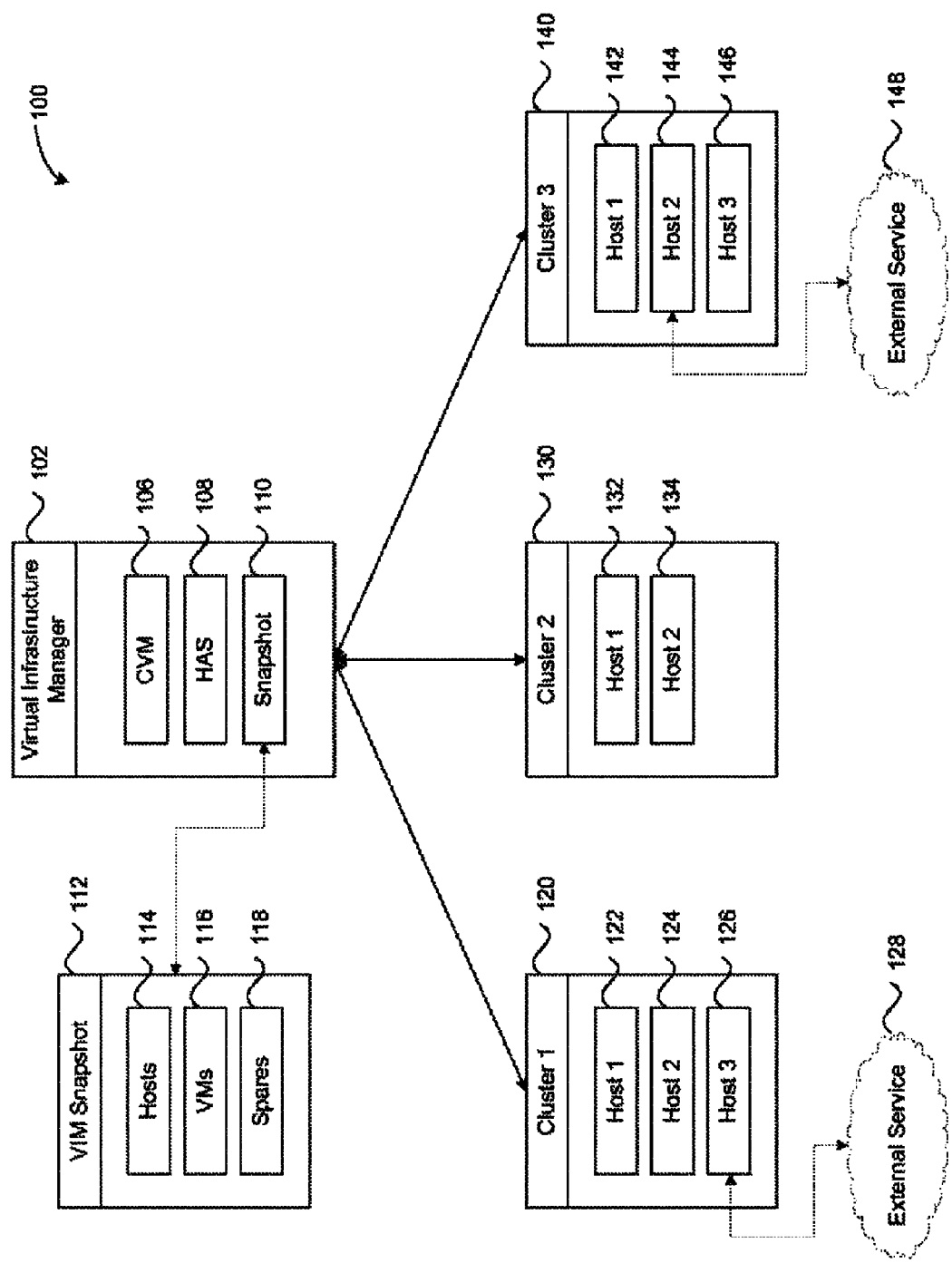
FIG. 1A is a schematic diagram of a hierarchical resource management system according to an embodiment of the present invention.

Embodiments of the invention provide methods and systems for cluster resource management in virtualized computing environments. In particular, embodiments of the invention provide techniques for cluster management software to ensure resource availability for requests to power on virtual machines (VMs) as well as for cluster management software to discover, obtain, and defragment the resources and VMs on a cluster, e.g., in response to requests to reserve resources for a VM. In one embodiment, a "VM spare" is used to reserve (or help discover or otherwise obtain) a set of computing resources for a VM. As used herein, a "VM spare" refers to a placeholder for a VM used by cluster management software to help manage the computing cluster. A VM spare may include a description of the computing resources needed for a VM (e.g., an amount of processing power, memory, storage, or other resource requirements).

VM spares are inserted into a snapshot of running VMs maintained by the cluster management software to reserve resources across a cluster. The spares are used by the cluster management software to help determine a distribution or allocation of resources for both the actual VMs instantiated on hosts in the cluster and for any VM spares in the snapshot, if possible. Note, while visible to the cluster management software, a VM spare does not correspond to an actual allocation or use of resources on any host (i.e., the VM spare does not necessarily correspond to a running VM). Instead, the VM spare provides a reservation of resources included in the view of the cluster maintained by the cluster management software (i.e., in the snapshot). The cluster management software accounts for the reserved resources when scheduling and allocating resources on the cluster; in particular, to reserve resources when determining VM distributions and power on recommendations for additional VMs to be spawned on the cluster and to reserve or allocate resources needed to recover from a host (or VM) failure.

VM spares may be used to reserve resources on the cluster in a variety of scenarios. A first example is the operation of a separate cluster service that may necessitate a workflow in which the separate cluster service first checks with the cluster resource management service to determine whether a cluster has sufficient compatible unfragmented resources to power-on one or more VMs. If so, the separate cluster service performs actions to prepare for the power-on of the VMs and then requests that the cluster resource management service actually power-on the VMs. If the resources needed for the VMs become reserved or unobtainable while the separate cluster service performs the actions to prepare for the power-on of the VMs, then the power-on of one or more VMs will fail after the separate cluster service completes the preparation work.

To address this scenario, in one embodiment, VM spares may be created which correspond to the VMs requested by the separate cluster service. This allows the separate cluster service to engage in whatever provisioning activity needs to be completed prior to actually powering on the requested VMs. At the same time, the spares introduced into the snapshot ensure that the resources needed for the requested VMs are not consumed by an intervening allocation request or VM distribution. Once the separate cluster service is ready, each VM spare may be replaced by a corresponding actual VM running on one of the hosts. That is, when the separate cluster service requests to power-on the requested VMs temporarily represented as VM spares, the VM spares are replaced with the actual, powered-on VMs in the snapshot. Note, in this scenario, the VM spares may have a limited lifetime. If the separate cluster service does not request that the VM spares actually be powered-on within the lifetime, then the cluster management software removes them from the snapshot. The cluster resource management service will generate VM migrations and host power-on recommendations as needed to provide (if possible) the compatible unfragmented computing resources required by spare VMs not yet assigned those resources.

A second example of using VM spares is when a VM failure occurs and the restart of the failed VM is attempted but failed. For example, a hypervisor running on each host may have software used to ensure that any failed VM is restarted. An example of this supporting technology is sold as Automated Availability Manager™ by VMware. The hypervisor detects the failed VM and attempts to restart the failed VM. In some cases, however, the first (or $n^{th}$) attempt at restarting the VM may be unsuccessful due to insufficient available compatible unfragmented resources on the cluster.

To address this scenario, in one embodiment, the hypervisor may request that spare VMs be created for any VMs that cannot be restarted on a first attempt (or other specified number of failed attempts). The cluster management software then attempts to migrate existing VMs across clusters and hosts to create compatible unfragmented resources on one of the hosts. In such a case, the VM spare serves as a signal to the cluster management software that the location of actual VMs (and spares) needs to be redone to allow sufficient, defragmented resources to be available on the host attempting to restart a failed VM, if possible. This may involve, e.g., powering on hosts and/or migrating existing VMs on that host to others. Doing so allows the hypervisor on the host where the defragmented resources are located to restart the failed VM on the next attempt. Once restarted, the corresponding spare(s) are then removed from the snapshot.

Still another example is when a user desires to ensure that a particular VM has compatible resources set aside for its use during failover. In such a case, a VM spare may be created that corresponds to the resources allocated to the particular VM. Further, the cluster management software may specify that the resources allocated to the spare need to be available on at least one host in the cluster that is not the same host running the VM for which the spare is created. That is, resources reserved for the VM spare need to be on a distinct host from the VM being protected from failover.

FIG. 1A is a schematic diagram of a hierarchical resource management system 100 according to an embodiment of the present invention. The term virtual infrastructure manager (VIM) as used herein refers to management software that provides a mechanism to configure and manage one or more hosts, virtual machines (VMs), and other components of virtualized infrastructure. For example, VMware vCenter™ capability provides either same or similar functionality. Similar management software is also available from other vendors. As shown, the system 100 includes VIM 102, where VIM 102 includes cluster virtualization management software (CVM) 106, High Availability Software (HAS) 108, and snapshot 110. VIM provides a collection of cluster management software and associated utilities used to manage clusters 120, 130, and 140. Of course, other server cluster virtualization management software may be used. In one embodiment, CVM 106 determines both an initial and ongoing locations of virtual machines (VMs) on hardware computing platforms in server clusters 120, 130, and 140 and manages the allocation of cluster computing resources. HAS 108 configures the system to monitor VMs running on any of the hosts in the clusters 120, 130, and 140 to detect operating system and hardware failures, restart virtual machines on other physical servers in the cluster without manual intervention when server failure is detected, and protect applications from operating system failures by automatically restarting virtual machines when an operating system failure is detected.

Snapshot 110 is an overview of the system 100 that is maintained by VIM 102. Illustratively snapshot 110 provides a representation of the resources managed and allocated by VIM 102. Illustratively, snapshot 110 includes information pertaining to hosts 114, VMs, 116 and VM spares 118 being managed by the VIM 102. Snapshot 110 is used to determine what resources are available on hosts in clusters 120, 130, and 140, as well as how those resources are allocated to VMs or reserved as VM spares.

Illustratively, VIM 102 is coupled to cluster 1 120, cluster 2 130, and cluster 3 140. Cluster 120, cluster 130, and cluster 140 each comprise one or more hosts. In this example, cluster 1 120 includes host 1 122, host 2 124, and host 2 126. Cluster 2 130 includes host 1 132 and host 2 134. Cluster 3 140 includes host 1 142, host 2 144, and host 3 146. Each of the hosts that are included in either cluster 1 120, cluster 2 130, or cluster 3 140 execute one or more VMs managed by VIM 102.

Host 3 126 and host 2 144 operate external service 128 and external service 148, respectively. In a particular embodiment, external service 128 is a web application that comprises three VMs running within host 3 126. Each of the three VMs serve to handle requests that originate from users on the front end of a webpage that is tied to the web application of external service 128 executing on the host 3 126. In a particular embodiment, external service 148 is a database management system that comprises six VMs running within host 2 144.

Figure 1B:
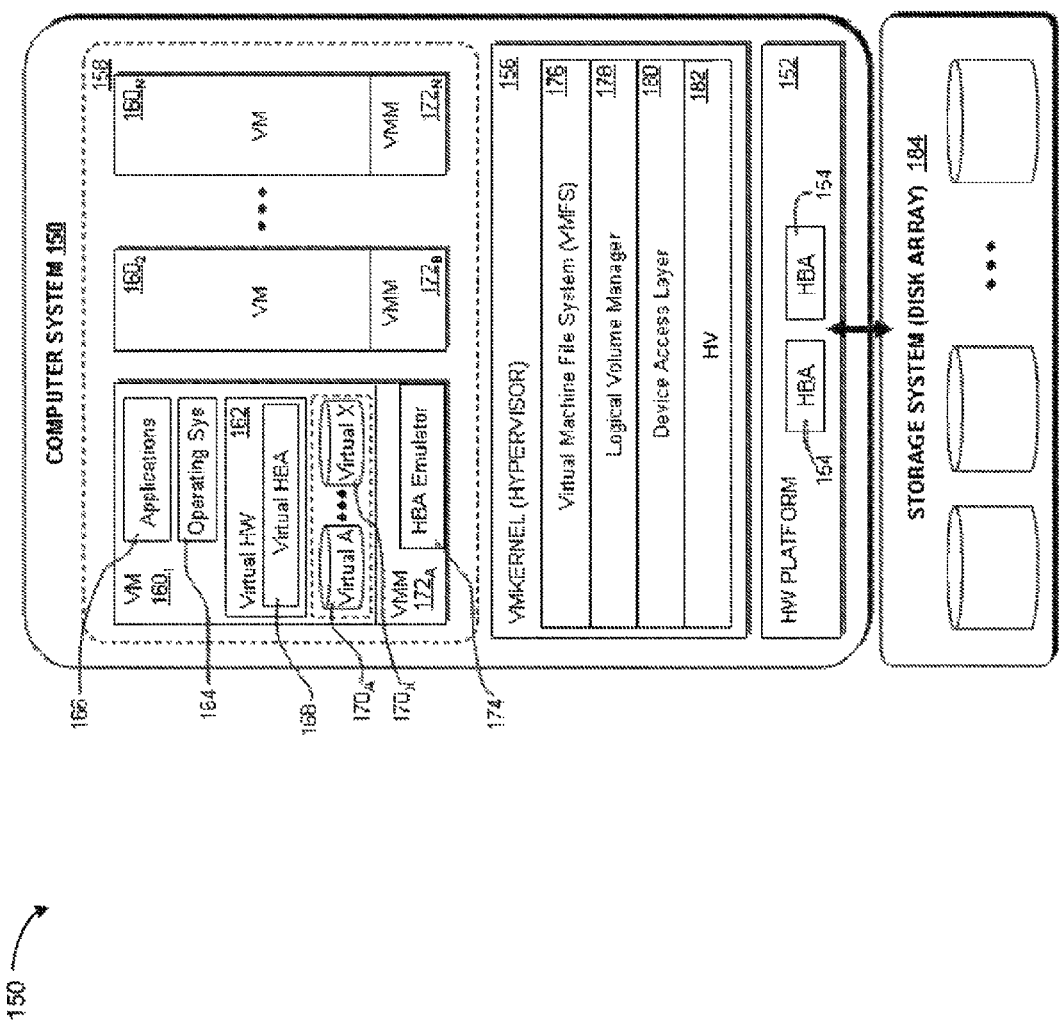
FIG. 1B illustrates the components of the hierarchical resource management system of FIG. 1A for one host in the cluster in additional detail.

FIG. 1B depicts functional block diagrams of virtualized computer systems in which embodiments of the invention may be practiced. Computer system 150 may be constructed on a conventional server-class, hardware platform 152 including host bus adapters (HBA) 154 in addition to conventional platform processor, memory, and other standard peripheral components (not separately shown). Hardware platform 152 may be coupled to an enterprise-class storage system 184. Examples of storage systems 184 may be a network attached storage (NAS) device, storage area network (SAN) arrays, or any other similar disk arrays. It should also be recognized that enterprise-level implementations of the foregoing may have multiple computer systems similar to computer system 150 that may be connected through various different known topologies and technologies (e.g., switches, etc.) to multiple storage systems 184. A virtualization software layer (also sometimes referred to as a hypervisor) such as, for example, VMware's VMkernel™ 156 in its server-grade VMware ESX® product, is installed on top of hardware platform 152 and supports a virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Similar to guest operating system 130, examples of guest operating system 164 may be the Microsoft Windows® operating system, a distribution of the Linux® operating system, Solaris x86, NetWare, FreeBSD or any other supported operating system. In each instance, guest operating system 164 includes a native file system layer (not shown), for example, either an NTFS or an ext3 type file system layer. These file system layers interface with virtual hardware platform 162 to access, from the perspective of guest operating systems 164, a data storage HBA, which in reality, is virtual HBA 168 implemented by virtual hardware platform 162 that provides the appearance of disk storage support (i.e., virtual disks $170_A$-$170_X$) to enable execution of guest operating system 164 transparent to the virtualization of the system hardware.

Although, from the perspective of guest operating systems 164, file system calls to initiate file system-related data transfer and control operations appear to be routed to virtual disks $170_A$-$170_X$, in reality, such calls are processed and passed through virtual HBA 168 to adjunct virtualization software layers (for example, VMM layers $172_A$-$172_N$) that implement the virtual system support needed to coordinate operation with VMkernel 156. In particular, host bus emulator 174 functionally enables guest operating system file system calls to be correctly handled by VMkernel 156 which passes such operations through to true HBAs 154 that connect to storage system 184. For example, VMkernel 156 receives file system calls from VMM layers $172_A$-$172_N$, and converts them into file system operations that are understood by virtual machine file system (VMFS) 176 which in general, manages creation, use, and deletion of files stored on storage system 184. VMFS 176, in turn, converts the file system operations to volume block operations, and provides the volume block operations to logical volume manager (LVM) 178, which supports volume oriented virtualization and management of the disk volumes in storage system 184. LVM 178 converts the volume block operations into raw disk operations for tranmission to device access layer 180. Device access layer 180, including device drivers (not shown), applies command queuing and scheduling policies to raw disk operations and sends them to HBAs 154 for delivery to storage system 184. HV 182 represents software that is used to ensure that any failed VM is restarted. An example of this supporting technology is sold as Automated Availability Manager™ by VMware.

Figure 2:
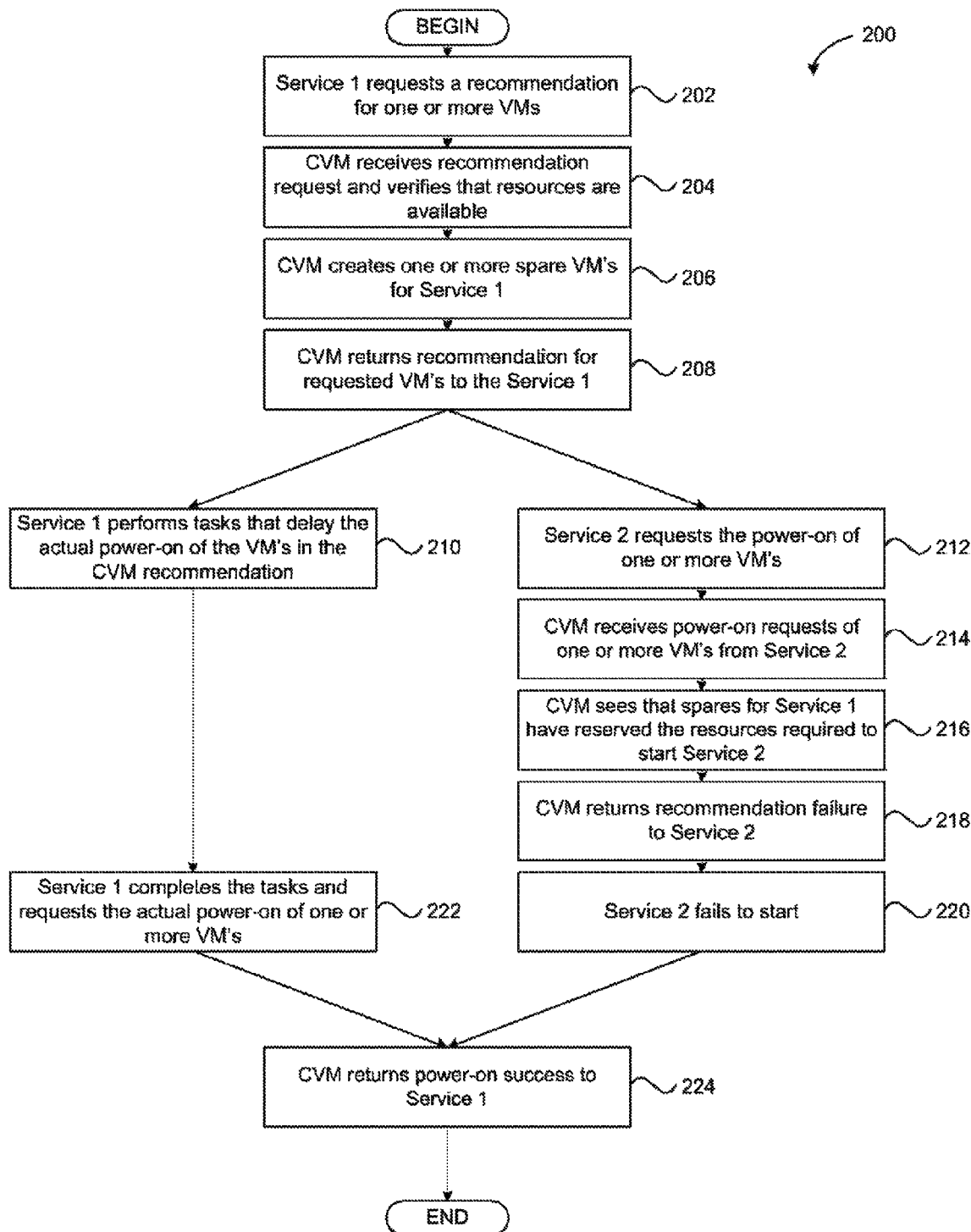
FIG. 2 is a flow diagram that depicts the steps of utilizing spare VMs to ensure the successful power-on of one or more VMs, according to one embodiment of the invention.

FIG. 2 illustrates a method 200 for using spare VMs to ensure the successful power-on of one or more VMs, according to one embodiment of the invention. In this particular example, assume the service is a site recovery manager application that provides the restoration of failed resources. In step 202, the service generates a request for a recommendation for placing a group of VMs on (or more) of the hosts in a given cluster, but not a request to actually power-on the requested group of VMs. The request for a given VM may specify what resources should be allocated for that VM, e.g., in terms of memory, processing power, storage or networking requirements, etc. For example, assume the service requests a recommendation for five VMs. In such a case, the service generates a request for the needed five VMs describing the requested resource allocations for each one and transmits the request to the cluster management software (e.g. CVM 106 of FIG. 1). The request to not actually power-on the requested VMs may allow the service to perform a variety of provisioning (or other) activities before actually powering-on the requested VMs.

In step 204, the cluster management software receives the request generated in step 202. In this example, a request for the five VMs is transmitted to and received by the cluster management software. Upon receipt, the cluster management software may determine whether resources are available to create the five VMs requested by the service. In one embodiment, the cluster management software uses the snapshot 110 depicted in FIG. 1 to determine the current overall organization of the clusters of hosts being managed. That is, the cluster management software may identify what compatible unfragmented resources are available across all hosts within a cluster (or how allocated resources may be reorganized) and compare this to the resources required to power-on the five VMs specified in the request sent by the service.

In step 206, the cluster management software determines that the compatible unfragmented resources required to start the five VMs requested by service 1 are available. Of course, if resources are not available for the requested VMs the cluster management software may simply return a message to the service indicating that the requested VMs cannot be created at that particular time. In one embodiment, however, if resources are available (or can be made available, e.g., by powering on an additional host or by moving a VM from one host to another), the cluster management software may create five VM spares, each corresponding to one of the VMs requested by the service and add the five VM spares to the snapshot. At this point, if the cluster management software receives a request to power-on additional VMs, the five VM spares in the snapshot count as allocated resources even though they are not instantiated or executing on any of the hosts within a cluster. Thus, the five spare VMs act as a reservation for five actual VMs to be powered-on by the service.

In step 208, the cluster management software generates a recommendation in response to the request that was transmitted by the service at step 204. In a particular embodiment, e.g., CVM 106 logs the service that requests the recommendation for the five VMs. When the service requests the actual power-on of the five requested VMs, the CVM 106 refers to the log of service requests to determine the corresponding five VM spares. The recommendation response may include an expiration time that specifies when the five VM spares will be removed from the snapshot. In one embodiment, if the expiration time is reached before the service requests to power-on of the five VM spares, then these spares may be removed by the snapshot, allowing resources allocated to these spares to be allocated to other VMs.

In step 210, service 1 receives the recommendation from the cluster management software (e.g., from CVM 106). The recommendation response informs service 1 that the five requested VMs have been reserved and may also indicate an expiration time. The particular lifetime for the VM spares may generally be tailored to suit the needs of a particular case. Typically, however, the time is set to an expected period needed to allow the service to carry out whatever provisioning (or other) activity needs to occur before the service can request the power-on of the VMs being represented in the snapshot by the VM spares. Once the service confirms that the recommendation will allow the five requested VMs to be powered-on, the service begins performing tasks that are required prior to the actual power-on of the five VMs.

Steps 212-220 illustrate how the reservation of the five VM spares affect other requests for resources, e.g., a request to power on one or more VMs, within a given cluster, according to one embodiment of the invention. In step 212, a second service (labeled as service 2), requests one or more VMs be powered on. For example, assume the second service requests three VMs be powered on. In such a case, the second service generates a VM recommendation request describing the three requested VMs and transmits the request to the cluster management software.

In step 214, the cluster management software receives the request, and upon receipt, determines whether resources are available to create the three VMs requested by the second service. Again, the cluster management software uses the snapshot to determine the current overall organization of the clusters of hosts being managed. Assume for this example that the five spare VMs exist in the snapshot and prevent the cluster management software from identifying sufficient resources to power-on the three VMs requested by the second service.

In step 216, the cluster management software determines that the compatible unfragmented resources required to start the three VMs requested by the second service are not available. In step 218, cluster management software generates a recommendation response to the recommendation request transmitted by service 2 in step 212. In step 220, service 2 receives the recommendation response from cluster management software. The recommendation response informs service 2 that the three requested VMs cannot be powered-on, and service 2 cannot fully operate.

In step 222, after service 1 completes whatever provisioning needs to be performed in a particular case. Service 1 then transmits a request to the cluster management software to power on the five VMs corresponding to the recommendation created at step 208 and included in the recommendation response received by service 1 in step 210.

In step 224, cluster management software identifies the five spare VMs and performs a power-on of each. Upon power-on, each spare is deleted from the snapshot and replaced by the corresponding powered-on VM. Importantly, in this example, if the five VM spares were not present in the snapshot when the second service requested a recommendation for three VMs (step 214), the cluster management software may have consumed some of the resources needed by the five VMs requested at step 202 to respond to the request form the second service. That is, after receiving a recommendation for performing a power-on of the five VMs requested by service 1, service 2 could inadvertently be allocated some of these resources. In such a case, once service 1 completed whatever initialization or provisioning tasks were being performed, the power-on request of all five VMs might fail as some of the resources could have been allocated in part, to service 2.

Figure 3:
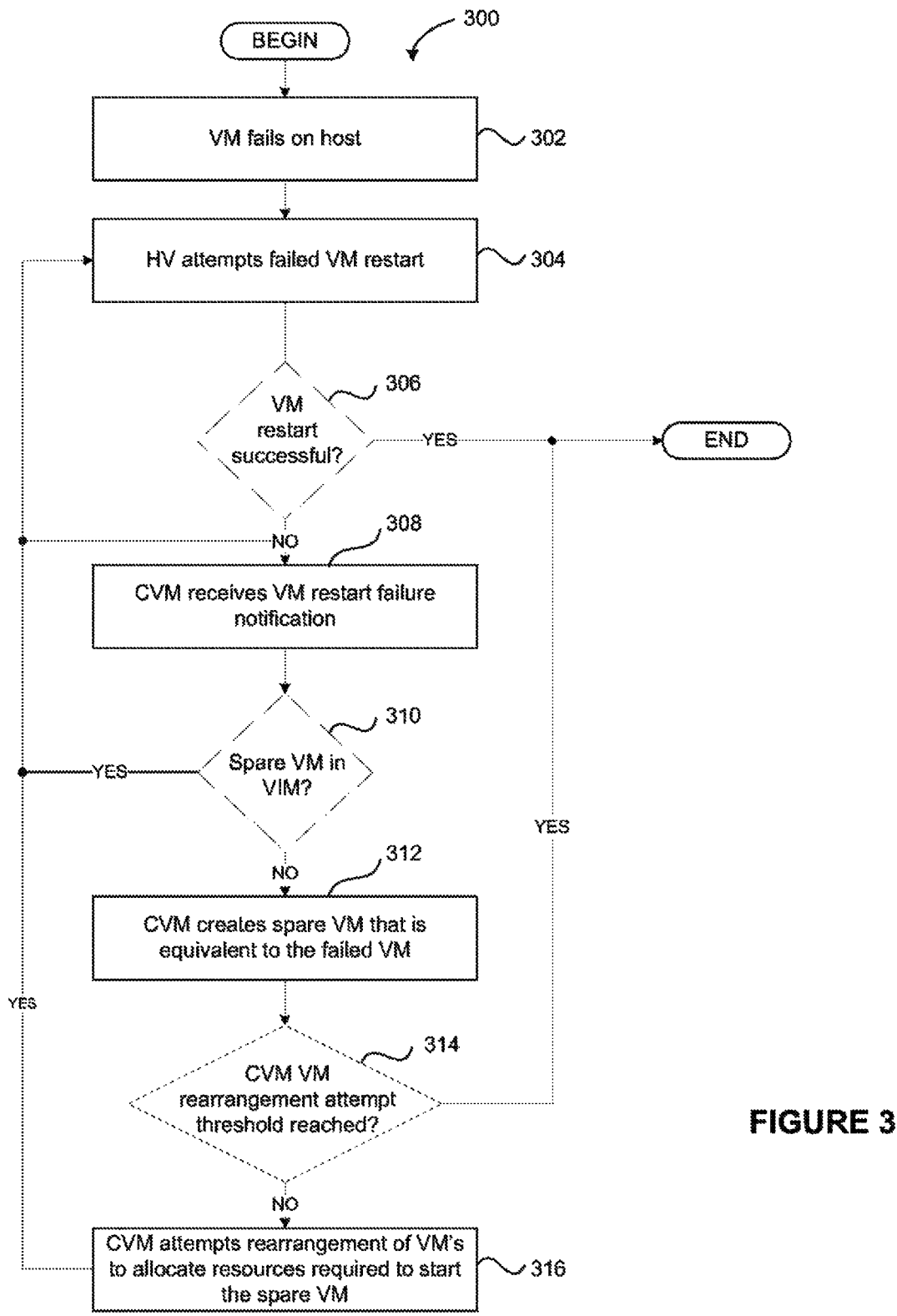
FIG. 3 is a flow diagram that depicts the steps carried out to perform a restart of a failed VM, according to one embodiment of the invention.

FIG. 3 illustrates a method 300 for restarting a failed VM using a VM spare, according to one embodiment of the invention. As shown, the method 300 begins at step 302, where one of the VMs running in a cluster fails. As noted above, in one embodiment, the hypervisor (e.g. VMware's ESX) may include a high availability component configured to monitor and restart any failed VM on a host, (e.g., HV 182) as well as share availably information with high availability components running on other hosts within a cluster.

In step 304, HV detects the VM failure and attempts to restart the failed VM. The failure may be a single VM on one host, or may result for a host itself failing. Typically, if a single VM fails on a host, it can be restarted on that same host using the resource it was using before. Assume for this example, however, a host fails and a VM from that host cannot be restarted due to lack of resources on other hosts in the cluster (and the absence of the resources of the failed host). In step 306, HV determines whether the failed VM can be restarted successfully. If the restart of the failed VM is successful, the method ends.

Otherwise (i.e., the attempt to restart the VM fails), subsequent attempts to restart may also fail unless additional hosts are powered-on and/or some VMs are migrated to free the resources required to restart the failed VM. Assume for this example that the restart of the VM is unsuccessful. In such a case, at step 308, HV notifies the cluster management software of the failed restart of the VM and requests assistance from the cluster management software.

It should be noted that HV may continue attempting to restart the failed VM while CVM attempts to allocate compatible unfragmented resources through the migration of VMs across clusters and hosts. Such migration may eventually free enough resources to restart the failed VM, and when the required compatible unfragmented resources are available, the HV restart of the failed VM will be successful and the method 300 ends. In a particular embodiment, the HV continues to attempt restarting the failed VM at a user-specified interval. Additionally, a restart count threshold may specify the number of attempts to try to restart the failed VM.

In step 308, CVM receives the VM restart failure notification from the HV. The VM restart failure notification includes an indication of what resources are needed to successfully restart the failed VM; namely, the size, amount, and/or type of resources allocated to the failed VM, e.g., in terms of memory, processing power, storage or networking requirements, etc.

In step 310, CVM evaluates the snapshot to determine if a spare VM that corresponds to the failed VM is already present. That is, whether a spare has been created to represent the failed VM when the cluster management software executes a scheduling/balancing/allocation procedure. In a particular embodiment, such a comparison is performed by comparing the failed VM to the spare VMs present in the VIM snapshot. If the snapshot does not include a spare VM that corresponds to the failed VM, step 312 follows. If, however, the snapshot does include a spare VM that is equivalent to the failed VM, CVM ignores the VM restart failure notification received from the HV in step 308.

If a VM spare has not been created to represent the failed VM in the snapshot, then in step 312, CVM creates a spare VM that corresponds to the failed VM and adds the spare VM to the VIM snapshot. The cluster management software subsequently attempts to free compatible unfragmented resources needed to accommodate the spare VM. In step 316, the cluster management software powers on additional hosts and/or migrates VMs to free up the resources needed to restart the failed VM. Such VM migration may include relocating and consolidating VMs in the hosts of a given cluster.

HV continues to attempt to restart the failed VM while the cluster management software attempts to free the compatible unfragmented resources for the VM spare created at step 312. If the HV successfully restarts the VM, CVM is notified of the restart and the spare VM corresponding to the failed VM is removed from the snapshot of the VIM. Both HV and the cluster management software will continue their respective tasks until thresholds, if present, are reached.

Eventually however, at step 314, if the cluster management software has attempted to rearrange the VMs beyond a specified threshold number of times (or beyond a specified time period), the method 400 ends, and the failed VM is not restarted using the VM spare created at step 312. In such a case, the VM spare created to correspond to the failed VM is removed from the snapshot. In one embodiment, the cluster management software may also notify HV that it was unable to create sufficient resources to allow the failed VM to be restarted. Subsequently, the HV ceases attempting to restart the failed VM.

FIG. 3 discusses a method of using spares to allow cluster management software to rearrange cluster resource allocations in order to restart a failed VM. However, the method 300 of FIG. 3 does not guarantee that the failed VM will restart successfully.

In some cases, however, users may desire a higher degree of failover certainty for particular VMs in a given cluster. That is, users may desire to ensure that should a given VM fail, resources are guaranteed to be available in the cluster to restart that VM. In one embodiment, a VM spare may be used as a failover mechanism to ensure that enough resources are reserved on a cluster to restart a particular VM in the event that VM should fail (or the host executing that VM fails). Additionally, a VM-to-VM anti-affinity rule may be used to create a relationship between a VM and a corresponding VM spare. The VM-to-VM anti-affinity rule may specify that the cluster management software should not rely on resources on the server system hosting a given VM to provide resources for the VM spare associated with that VM.

Figure 4:
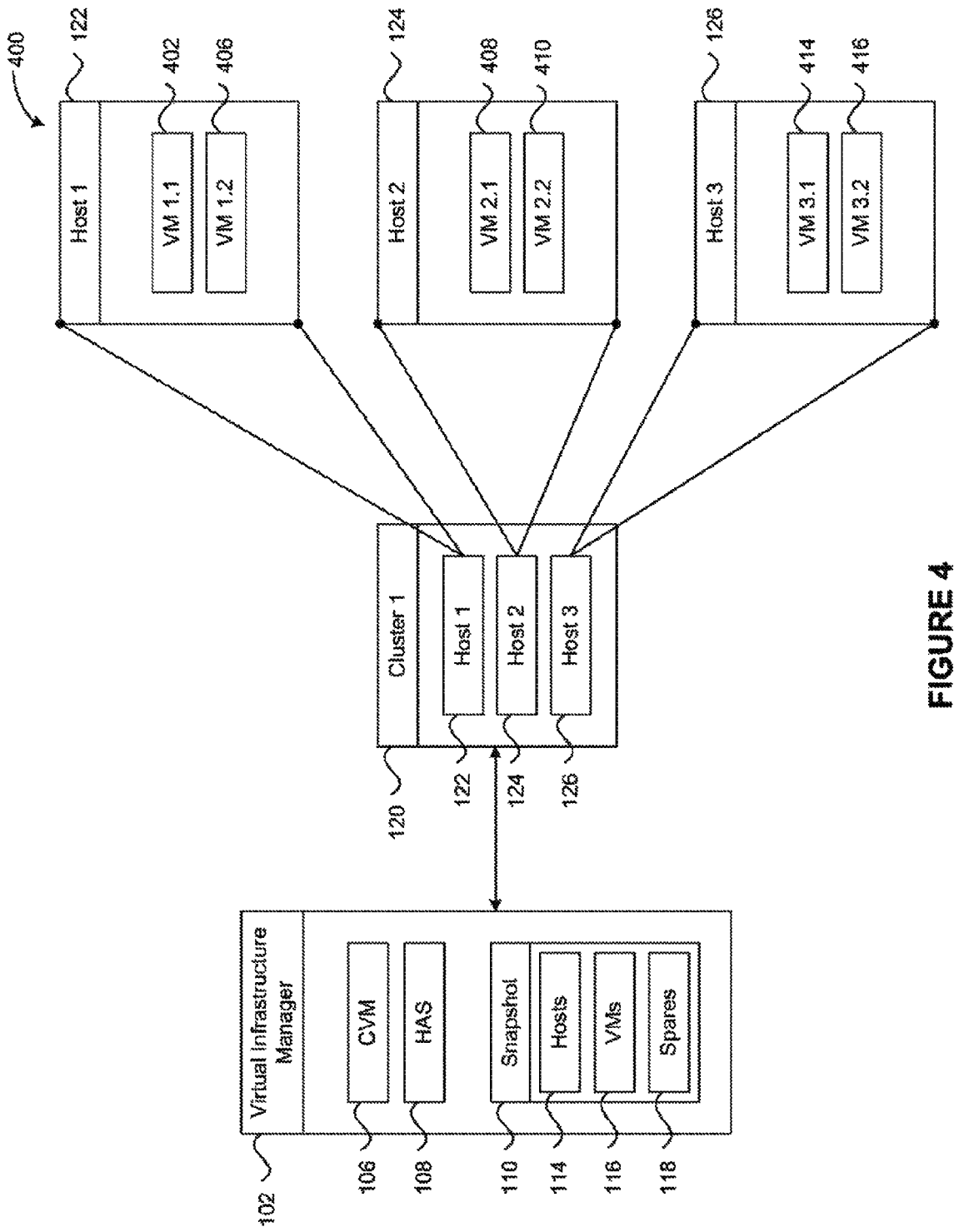
FIG. 4 conceptually illustrates the process of providing failover protection to a particular VM through spare VMs and VM-to-VM anti-affinity rules.

FIG. 4 is a conceptual illustration of providing failover protection to a particular VM through VM spares and VM-to-VM anti-affinity rules, according to one embodiment of the invention. As shown, a hierarchical resource management system 400 includes VIM 102, VIM snapshot 110, and cluster 120. In turn, cluster 120 includes hosts, 122, 124, and 126, and each of the hosts 122, 124, and 126 is executing a set of VMs managed by VIM 102. Specifically, host 1 122 includes VM 1.1 402 and VM 1.2 406. Host 2 124 includes VM 2.1 408 and VM 2.2 410 and host 3 126 includes VM 3.1 414 and VM 3.2 416.

As shown, the cluster 120 could accommodate three additional VMs of roughly the same size as those running one on each of hosts 122, 124, and 126, but assume the host running VM 406 has a VM spare used to reserve resources on hosts 122 and 126, should host 124 fail. In one embodiment, e.g., an anti-affinity rule may be used to specify that resources reserved on a cluster for a given VM spare cannot be reserved from the host on which the given VM is running. In this example, as VM 406 is running on host 124, the resources for a VM spare for VM 406 are allocated in the snapshot 118 from resources on either host 124 or 126. This results in space on hosts 122 and 126 for one additional actual VM instance and unallocated resources sufficient to allow VM 406 to be restarted on one of hosts 122 and 126 should host 122 fail. Also, host 124 has space for a third VM unaffected by the reservation of resources for a VM spare for VM 406.

Of course, this example generalizes and anti-affinity rules and VM spares may be used to reserve resources for multiple VM hosts on cluster 120. For example, assume a VM spare 118 and anti-affinity rule is create for each of hosts 402 and 406. In such a case, the cluster 120 could support admission of one additional VM (on host 122), but the space available on hosts 124 and 126, although not fully allocated, is reserved for hosts 402 and 206 in the snapshot 110. OR as another example, a VM spare 116 could be created for each of the VMs on hosts 122, 124, and 126. In such a case, the cluster 120 would prevent the addition of further hosts, as the resources on any two of these hosts are reserved in the event the third fails.

Further, a failover policy may be used to define dedicated failover hosts using VM spares. For example, an affinity rule may be used to restrict the resources reserved for a set of a VM spares to being allocated from a failover host(s). That is, the definition of a VM spare 116 in the snapshot 118 may specify that a given VM spare is "compatible" only with the failover host(s), so they can't be "moved" to other hosts in the cluster 120 as resources are allocated by VIM 102. More generally, the cluster management software may allow users to specify a failover policy, where VM spares are used to reserve the resources available from a dedicated failover host(s). Doing so prevents users (or the cluster management software) from powering on or migrating VMs to those host(s) with the resources reserved in the snapshot as VM spares. Alternatively, rather than reserve resources for a specific VM, a failover policy may be used reserve a specified percentage of the resources in the cluster. Such resources could be reserved on a dedicated failover host (or hosts) or from the hosts of the cluster generally.

Advantageously, the embodiments of the invention provide methods and systems for cluster resource management in virtualized computing environments. As described above, VM spares are used to reserve (or help discover or otherwise obtain) a set of computing resources for a VM. While VM spares may be used for a variety of scenarios, particular uses of VM spares include using spares to ensure resource availability for requests to power on VMs as well as for discovering, obtaining, and defragmenting the resources and VMs on a cluster, e.g., in response to requests to reserve resources for a VM or to respond to a notification of a failure for a given VM.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for managing computing resources available in a computing cluster, the method comprising:
    storing a representation of available computing resources for new virtual machines (VMs), the available computing resources excluding computing resources allocated at a point in time to one or more VMs executing within the computing cluster and computing resources reserved at the point in time for one or more spare VMs, which correspond to VMs that are not currently executing but are to be executed within the computing cluster alongside the one or more VMs;

in response to receiving a power-on request to power on a new VM, allocating the computing resources reserved for the spare VM to the new VM and powering on the new VM, wherein, after powering on the new VM, the number of running VMs is one greater than before powering on the new VM.

2. The method of claim 1, wherein the representation of available computing resources allocated to the one or more spare VMs include an indication of at least one of: a memory amount, processing capacity, a storage capacity, or networking resources to allocate a given spare VM.

3. The method of claim 1, further comprising:
receiving a request for a recommendation for powering-on one or more VMs in the computing cluster;
evaluating the representation of the available computing resources to determine whether computing resources are available to allocate for each of the VMs in the request; and
in response to determining that computing resources are available to allocate for each of the VMs in the request, generating one or more spare VMs, wherein each generated spare VM corresponds to one of the VMs in the request.

4. The method of claim 1,
wherein each of the one or more spare VMs has an associated expiration time interval, and
wherein, at the end of the expiration time interval, computing resources previously allocated to the spare VM are deallocated from the spare VM.

5. The method of claim 1, further comprising:
creating the spare VMs in response to a request for a recommendation for powering-on a corresponding number of VMs in the computing cluster, wherein a requestor of the recommendation and a requestor of the power-on request are the same.

6. The method of claim 5, further comprising:
receiving another request for powering-on a VM and, in response thereto, returning a failure indication, wherein a requestor of the recommendation and a requestor of the other power-on request are different.

7. A non-transitory computer-readable storage medium containing a program, which, when executed on a processor, performs an operation for managing computing resources available in a computing cluster, the operation comprising:
storing a representation of available computing resources for new virtual machines (VMs), the available computing resources excluding computing resources allocated at a point in time to one or more VMs executing within the computing cluster and computing resources reserved at the point in time for one or more spare VMs, which correspond to VMs that are not currently executing but are to be executed within the computing cluster alongside the one or more VMs;
in response to receiving a power-on request to power on a new VM, allocating the computing resources reserved for the spare VM to the new VM and powering on the new VM, wherein, after powering on the new VM, the number of running VMs is one greater than before powering on the new VM.

8. The non-transitory computer-readable storage medium of claim 7,
wherein the representation of available computing resources allocated to each of the one or more spare VMs includes an indication of at least one of: a memory amount, processing capacity, a storage capacity, and networking resources to allocate a given spare VM.

9. The non-transitory computer-readable storage medium of claim 7, wherein the operation further comprises:
receiving a request for a recommendation for powering-on one or more VMs in the computing cluster;
evaluating the representation of available computing resources to determine whether computing resources are available to allocate for each of the VMs in the request; and
in response to determining that computing resources are available to allocate for each of the VMs in the request, generating one or more spare VMs, wherein each generated spare VM corresponds to one of the VMs in the request.

10. The non-transitory computer-readable storage medium of claim 7,
wherein each of the one or more spare VMs has an associated expiration time interval, and
wherein, at the end of the expiration time interval, computing resources previously allocated to the spare VM are deallocated from the spare VM.

11. A system comprising:
a computing cluster comprising a plurality of hosts, each having at least a processor and a memory, wherein each host is configured to execute a plurality of virtual machines (VMs);
a management console comprising at least a processor, a memory, and a cluster management program, which, when executed on the processor, performs an operation for managing computing resources available in the computing cluster,
the operation comprising:
storing a representation of available computing resources for new virtual machines (VMs), the available computing resources excluding computing resources allocated at a point in time to one or more VMs executing within the computing cluster and computing resources reserved at the point in time for one or more spare VMs, which correspond to VMs that are not currently executing but are to be executed within the computing cluster alongside the one or more VMs;
in response to receiving a request to power on a new VM, allocating the computing resources reserved for the spare VM to the new VM and powering on the new VM, wherein, after powering on the new VM, the number of running VMs is one greater than before powering on the new VM.

12. The system of claim 11, wherein the representation of available computing resources allocated to each of the one or more spare VMs include an indication of at least one of: a memory amount, processing capacity, a storage capacity, and networking resources to allocate a given spare VM.

13. The system of claim 11, wherein the operation further comprises:
receiving a request for a recommendation for powering-on one or more VMs in the computing cluster;
evaluating the representation of available computing resources to determine whether computing resources are available to allocate for each of the VMs in the request; and
in response to determining that computing resources are available to allocate for each of the VMs in the request, generating one or more spare VMs, wherein each generated spare VM corresponds to one of the VMs in the request.

14. The system of claim 11,
wherein each of the one or more spare VMs spares has an associated expiration time interval, and wherein, at the end of the expiration time interval, computing resources allocated to the spare VM are deallocated from the spare VM.

\* \* \* \* \*